Figure 1:
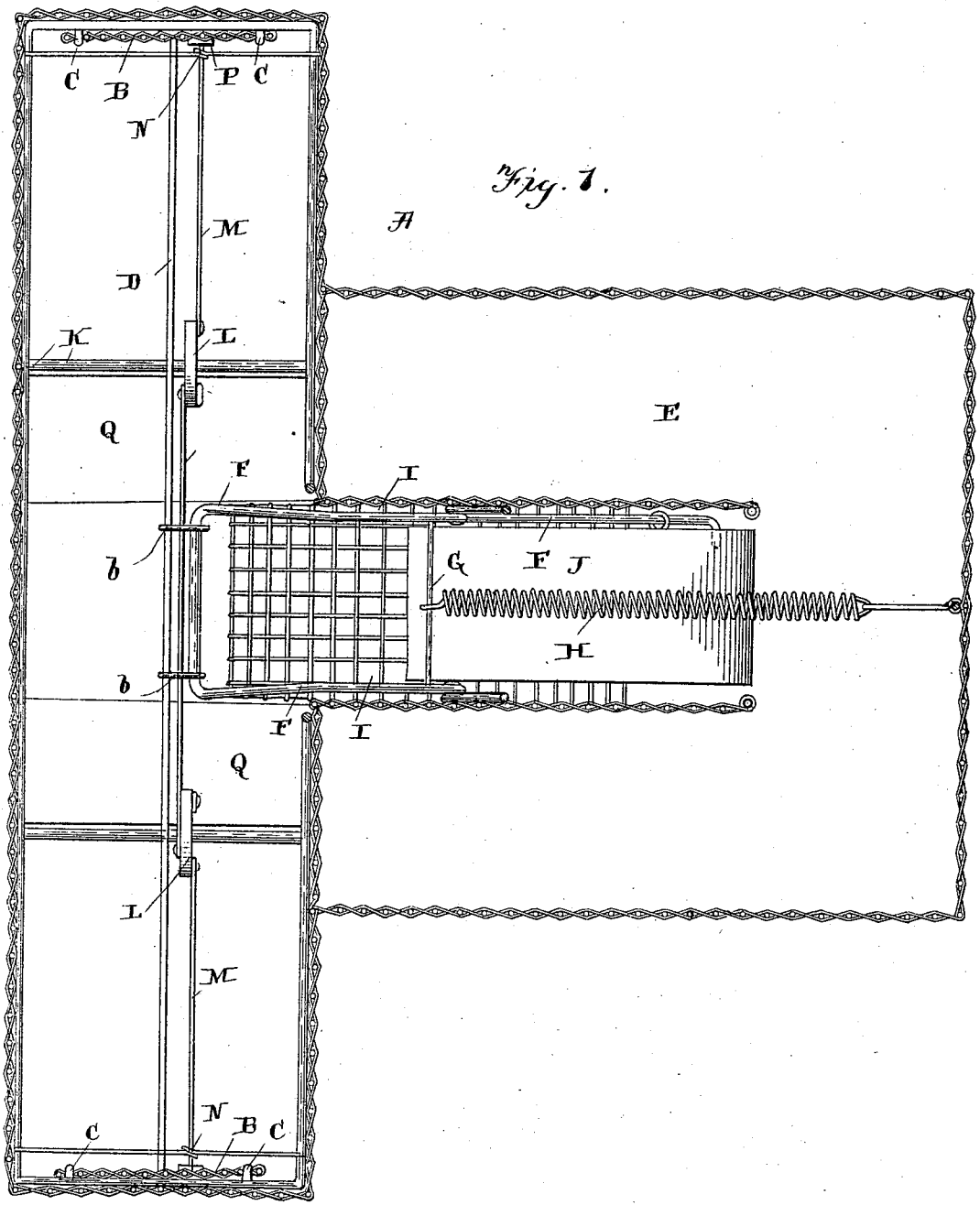

(No Model.)　　　　　　M. B. MORRIS.　　　2 Sheets—Sheet 1.
ANIMAL TRAP.

No. 522,165.　　　　　　　　　Patented June 26, 1894.

WITNESSES
Geo. E. Frech,
D. P. Cowl

INVENTOR
M. B. Morris
per Lehmann Pattison & Nesbit
attys

THE NATIONAL LITHOGRAPHING COMPANY.
WASHINGTON, D. C.

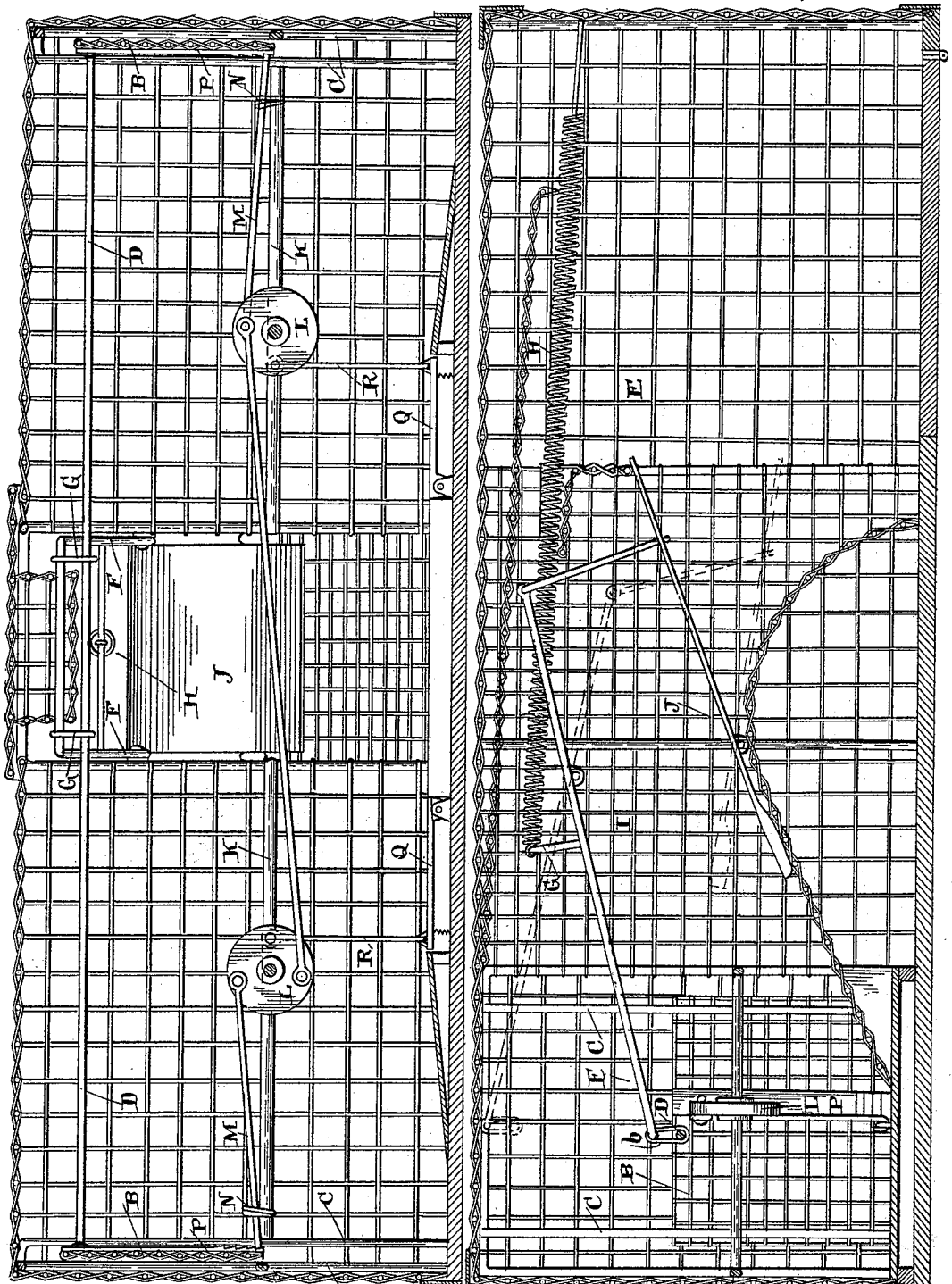

UNITED STATES PATENT OFFICE.

MARK B. MORRIS, OF LOGANSPORT, INDIANA.

ANIMAL-TRAP.

SPECIFICATION forming part of Letters Patent No. 522,165, dated June 26, 1894.

Application filed March 3, 1894. Serial No. 502,286. (No model.)

*To all whom it may concern:*

Be it known that I, MARK B. MORRIS, of Logansport, in the county of Cass and State of Indiana, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to improvements in animal traps, and it consists in the construction and arrangement of parts which will be fully described hereinafter, and particularly pointed out in the claims.

The object of my invention is to provide an animal trap, which after being once set, is automatically closed by the animal as it passes into it, and then in passing on farther, the inlet door or doors (as the case may be) are automatically set for the entrance of other animals.

In the accompanying drawings:—Figure 1 is a plan view of the trap with the top removed. Fig. 2 is a longitudinal vertical sectional view of the same. Fig. 3 is a transverse vertical sectional view taken on the dotted line *x—x* of Fig. 1.

The trap shown in the accompanying drawings is one having two doors, in which event the frame-work thereof is preferably essentially cross-shape in plan, but the shape may be varied at will as will be readily understood without departing from my invention, and which will preferably not be cross-shape when only a single inlet door is provided.

A indicates the inlet end of the trap which is provided at each end with an opening and a vertical door B therefor, which moves vertically upon suitable vertical guide rods C. A rod D has each end thereof connected in any suitable manner with each door, and which rod extends longitudinal the inlet end of the door as shown.

Extending longitudinal the portion E of the trap, into which the animal eventually wanders, is an intermediately pivoted lever F, which has its forward end *a*, essentially U-shaped in plan, and the extremity of this U-shaped end is attached to the rod D by means of links *b*, and the inner ends of this U-shaped portion is provided with a cross bar G, to which one end of a spring H, is attached the opposite end of this spring being connected to the outer end of the portion E of the trap as clearly illustrated in Fig. 1. This spring is for the purpose of counter-balancing the weight of the rod D and the doors carried by said rod, so that the lever F is about balanced. This may be done however by means of a counter-weight in the place of a spring as will be readily understood, though I prefer a spring.

A passage-way I extends longitudinal the portion E of the trap, and affords communication from the inlet portion to the portion E, and the intermediately pivoted lever is supported within and extends longitudinal this passage-way. An intermediately pivoted platform J is pivoted upon the floor of the passage-way, and the pivotal point of this platform is in front of the inner end of the intermediately pivoted lever, and this end of the said lever is bent laterally and extends under the inner end of the said platform, for a purpose to be fully described presently. Extending transverse the inlet end of the box at each side of the said passage-way are the rods K, upon which are journaled the disks L, about midway the said rods. Connecting these disks at opposite peripheries thereof, is a rod serving as a link or pitman, and pivotally connected with these disks are the outwardly extending endwise moving bolts M, which have their outer ends supported and moving in suitable guides N. The outer ends of these bolts are adapted to engage vertical plates P, which are secured to the inner sides of the doors B, the lower ends of these plates having ratchet teeth or notches, with which the outer ends of the bolts engage for the purpose of supporting the doors in a vertical position to permit ingress of the animals. Just below the said disks are movable preferably spring supported platforms Q which form a part of the floor of the inlet end of the trap, and these platforms are connected with the disk by means of vertical rods R. When either one of these platforms is depressed, it causes the disk connected therewith by means of a rod to oscillate, which oscillation withdraws the bolt attached thereto from engagement with the door adjacent thereto, and this movement through the medium of the rod which connects the two disks effects the endwise movement of the bolt at the opposite end of the inlet end of the trap, so that by the depressing of either platform, both of said doors are released and drop, thus closing the inlets at either end of the inlet end of the trap, as will be readily understood.

The operation of my invention is as follows:—The trap is set with the doors raised, and the bolts in engagement therewith. An animal entering either door and passing into the trap steps upon one of the delicately supported platforms Q which instantly releases both doors, which drop, thus cutting off the escape of the animal. Naturally the animal wanders into the passage-way, attracted by bait placed in the portion E of the trap, and in passing over the platform pivoted within the said passage-way, depresses its inner end, and through the medium of the intermediately pivoted rod lifts the doors, which are engaged and supported by the said bolts, so that the trap is again set, while the escape of the animal within the portion E of the trap is cut off by the inner end of the platform in the said passage-way moving upward as shown in Fig. 2. In this manner the trap is alternately closed and set by the animal passing thereinto.

While I here show two doors, it will be readily understood that but one door can be used, and the operation of the invention remains the same. Some animals are adverse to passing into anything which they cannot see through, and hence the use of two doors opposite each other, while for use in catching other animals it may be found desirable to use but one door. So also instead of placing the door at the end of the portion A of the trap and at right angles to the passage-way, it can be placed in a line with the passage-way, as will be clearly conceived, the holding bolt in that instance, and the platform for operating it being turned in a line with the said passage-way instead of transverse as shown in the accompanying drawings, without materially departing from the spirit of my invention.

Having thus described my invention, what I claim, and desire to secure by Letters Patent, is—

1. A trap comprising an inlet door, a bolt engaging directly the door, a platform in the floor connected with and operating the bolt when the platform is depressed, a separate compartment, a passageway communicating therewith a pivoted platform within and closing said passageway, an intermediately pivoted lever above said platform, one end of said lever connected with the platform and its opposite end connected with the door, and a spring or counterweight for elevating the door, substantially as described.

2. A trap comprising an inlet compartment having a door at each end, a passageway extending therefrom intermediate its ends, a depressible platform at each end of the inlet compartment, a disk supported and journaled over each platform, a bolt connected with each disk and engaging each door, a rod connecting the disks, a platform pivoted within the said passageway, a connection between said platform and the doors, and a spring or counterweight for elevating the doors, substantially as specified.

In testimony whereof I affix my signature in presence of two witnesses.

MARK B. MORRIS.

Witnesses:
ROBT. RAY,
FRANK BINZ.